(12) United States Patent
Schutz

(10) Patent No.: US 7,548,888 B2
(45) Date of Patent: Jun. 16, 2009

(54) DIGITAL COMPUTER SYSTEM AND METHODS FOR IMPLEMENTING A FINANCIAL TRANSACTION

(76) Inventor: Jared P. Schutz, 1920 13th St., Suite A, Boulder, CO (US) 80302

( * ) Notice: Subject to any disclaimer, the term of this patent is extended or adjusted under 35 U.S.C. 154(b) by 1351 days.

(21) Appl. No.: 09/747,506

(22) Filed: Dec. 22, 2000

(65) Prior Publication Data

US 2002/0103763 A1    Aug. 1, 2002

(51) Int. Cl.
*G06Q 20/00* (2006.01)

(52) U.S. Cl. .................. 705/64; 705/1; 705/26; 705/39; 705/50

(58) Field of Classification Search .................. 705/26, 705/50, 51, 1
See application file for complete search history.

(56) References Cited

U.S. PATENT DOCUMENTS

| | | | |
|---|---|---|---|
| 5,513,117 A * | 4/1996 | Small | 700/233 |
| 5,715,314 A * | 2/1998 | Payne et al. | 705/78 |
| 5,815,665 A * | 9/1998 | Teper et al. | 709/229 |
| 5,961,593 A * | 10/1999 | Gabber et al. | 709/219 |
| 5,991,738 A * | 11/1999 | Ogram | 705/26 |
| 6,327,578 B1 * | 12/2001 | Linehan | 705/65 |

OTHER PUBLICATIONS

"website", "HTML", "hypertext", "HTML document" Microsoft Press Computer Dictionary, Third Edition, 1997.*

* cited by examiner

*Primary Examiner*—Calvin L Hewitt, II
*Assistant Examiner*—Zeshan Qayyum
(74) *Attorney, Agent, or Firm*—Peter K. Trzyna, Esq.

(57) ABSTRACT

Computer-aided methods (making and using), along with a corresponding machine, article of manufacture, and data structures, is provided for using a computer system to implement a financial transaction, the method including the steps of: providing a first web site having identifier data; encrypting the identifier data; using a URL to log on to a second web site, said log on using the encrypted identifier data for passing the encrypted identifier data to a second web site; and implementing the financial transaction by using the encrypted identifier data from the second web site. A browser can be employed to communicate payment data over the Internet for reconciling a payment for the purchase invisibly to the purchaser by using the payment data communicated by the browser to implement the financial transaction. A computerized customer order is utilized to implement the financial transaction by triggering a communication of real time payment data from a non-customer computer to a vendor computer without customer intervention.

22 Claims, 13 Drawing Sheets

FIG. 13

| NAME | MAX LEN | REQUIREMENTS |
|---|---|---|
| FROM EMAIL | 100 | VALID EMAIL ADDRESS - SOMEONE@SUBDOMAIN.COM |
| TO EMAIL | 100 | AS ABOVE |
| FROM FIRSTNAME | 15 | |
| FROM LASTNAME | 20 | |
| FROM ADDRESS1 | 30 | |
| FROM ADDRESS2 | 30 | OPTIONAL |
| FROM CITY | 18 | |
| FROM STATE | 2 | 'AL' TO 'WY' (ONLY 50 STATES) |
| FROM ZIP | 10 | 5 OR 9 DIGITS |
| FROM PHONE1 | 15 | DAYTIME PHONE - 10 DIGITS (AREA CODE + PHONE NUMBER) |
| FROM PHONE2 | 15 | OPTIONAL EVENING PHONE (AS ABOVE) |
| FROM CC NUMBER | 19 | 13 TO 16 DIGITS, AMEX, VISA, MC OR VISA. SHOULD BE CHECKED FOR PROPER TYPE OF CARD AND CHECKSUM VALIDITY. SE CAN PROVIDE THIS CODE IF NEEDED. |
| FROM CC CARDHOLDER | 30 | MONTH AS '1' TO '12' |
| FROM CC EXP MONTH | 2 | YEAR AS '1999' TO '2006' |
| FROM CC EXP YEAR | 4 | OPTIONAL BUT TAKES PRIORITY OVER 'FROM FIRSTNAME' +' '+'FROM LASTNAME' |
| SKU | VARIES | STRING CONTAINING PRODUCT SKU |

DIGITAL COMPUTER SYSTEM AND METHODS FOR IMPLEMENTING A FINANCIAL TRANSACTION

I. COPYRIGHT NOTICE

A portion of the disclosure of this patent document contains material which is subject to copyright protection. The copyright owner has no objection to a statutory fair use of this material, as it appears in the files of the files or records of the U.S. Patent and Trademark Office, but otherwise reserves all copyright rights whatsoever.

II. FIELD OF THE INVENTION

The present invention pertains to an electrical digital computer machine and a data processing system, methods of making and for using the machine, products produced thereby, as well as data structures and articles of manufacture pertaining thereto, along with all necessary intermediates, all in the field of computerized aspects of financial transactions, especially as carried out over Internet-type networks. More particularly, this invention relates to a digital electrical data processing system for a process for conducting a financial transaction by communicating data such as by way of a browser especially in triggering communication of real time payment data from a non-customer computer to a vender computer without customer intervention.

III. BACKGROUND OF THE INVENTION

Online ordering is relatively new, but to date no one has been able to use the online ordering medium for its true potential. As people communicate more and more over internet mediums such as Instant Messaging (IM) and email, there are entire relationships that exist without the participants exchanging physical addresses for privacy and security reasons. So too, good friends remain in touch via email as they move around the country and the email address is replacing the physical address as the address of choice that is in the ready memory of many Americans. The inventor, for instance, does not know the physical address of his sister in Boston, his cousin in New York, or his high school friend in Palo Alto. Rather, he relies on email for contact. Absent this invention, the inventor would need to find out the physical addresses of these people if he wanted to send them gifts. Emailing his friend in Palo Alto requesting his address would alert the friend that he was going to receive something and spoil the surprise in addition to being inconvenient for both parties.

There has not been any way to send someone a gift, cash, or a charitable contribution in their name over the internet and without having to know their physical delivery information. Other solutions for this problem have included "wish lists" in which an ecommerce site (amazon.com for instance) allows people to browse and place items in a special area that a potential gift giver can view. However, the gift giver would still need to know where to ship the items to after purchasing them and thus would need to research a physical address.

Another problem is created through the inability of the recipient to schedule delivery. A giftgiver might know the physical address of a friend and send them flowers only to find out later that the friend was out of town that week and by the time she returned home the flowers had died. Until now, this has required that diligent gift givers check with their recipients ahead of time, again potentially ruining the surprise. Freight companies have attempted to solve this by leaving door knockers at residences if the recipient is out of town and rescheduling delivery upon a call from the recipient when he or she returns. This solution is not only inefficient for the freight company, but does not work in the case of a perishable gift like flowers.

Finally, there is the difficulty of sending money and conveyances of value online and offline. Checks can take several days to clear, and other forms of payments such as money orders and cash risk being lost in transit. No one has yet created a way to convey online payment information from one person to another person such that it can be redeemed without a merchant account or other form of relationship with a financial institution.

III. SUMMARY OF THE INVENTION

A. Objects and Advantages

The objects and advantages of the present invention are:
   It is an object of the present invention to provide a computer system that facilitates financial transactions, especially over Internet-type networks;
   It is another object of the present invention to provide a computer system that improves over the above-mentioned limitations in the prior art;

B. Summary of the Invention

In accordance with the objects of the present invention, generally, there is provided a computer system to implement a financial transaction with the user experience and details of the technical procedures are illustrated by an integration of Lucidity, Inc. and Gift Merchant (e.g., flowers/chocolates). The integration allows a Blue Mountain (for example) user to attach an order for a box of chocolates or whatever to an E-greeting card or similar such message, email or the like. Gift Merchant provides delivery and order fulfillment, while most of the functionality and html is housed with Lucidity and Blue Mountain (it being understood that the particular companies are only intended as an illustration for analogous institutions and the particular products involved being only illustrative of other products supplied by the system that is the substance of the invention.

The system has several conceptual components: giving or receiving, herein illustrated by card sending and card receiving, each having an attachment. In the sending component, order data is collected on Lucidity's web site, and sent to Gift Merchant's site, which provides a success/failure message depending on whether the order was successful, preferably in real time. Receiving is illustrated split between Blue Mountain and Gift Merchant. A user picks up a card at Blue Mountain, and then proceeds to fill out a form on the Gift Merchant site to have the product/service shipped or otherwise provided.

A utility and benefit of the present invention is that there is only necessary one point of contact between Lucidity and Gift Merchant, which is when the order is submitted to Gift Merchant for processing. Either the order succeeds or fails, and the logic behind the interface is transparent to Lucidity (and preferably to the customer). The end result is integration without customer hassle.

Reference herein is made to Blue Mountain dot corm, which will send an email to a recipient to notify him or her to pick up a card. The user clicks on a URL to view the card, which contains a notice that a gift (or other communication of value) is attached. The user clicks on the attachment notice and is directed to Gift Merchant via the URL containing the id as part of a string passed back to Gift Merchant (invisible to the recipient). The recipient can use a URL such as www.savage-comedy.com/~dans/card/pickup.phtml?ID=40CharacterString To complete the pick up, Gift Merchant will present the user with a simple form to complete the order with shipping information. Upon completion Gift Merchant will promote the order back to its back end processing system for shipping. The end result is integration and pick up without entering duplicative information and particularly without recipient hassle.

More particularly, the invention herein correspondingly comprehends a machine (programmed computer), methods for making and using it, products produced by the method, data structures, and necessary intermediates, collectively referenced herein after as the method (for the sake of brevity). Accordingly, the invention can be illustrated as a computer-aided method for using a computer system to implement a financial transaction, and method can include the steps of: providing a first web site having identifier data; encrypting the identifier data; using a URL to log on to a second web site, said log on using the encrypted identifier data for passing the encrypted identifier data to a second web site; and implementing the financial transaction by using the encrypted identifier data from the second web site. Viewed from another perspective, the method can include the steps of using a browser to communicate payment data to over the Internet; implementing a purchase over the Internet with the payment data communicated by the browser; and reconciling a payment for the purchase invisibly to the purchaser by using the payment data communicated by the browser to implement the financial transaction. Viewed from still another perspective, the method can include the steps of using a computerized customer order to implement the financial transaction by triggering a communication of real time payment data from a non-customer computer to a vendor computer without customer intervention.

In any such view of the invention, the triggering can be carried out over a proxy server, over an Internet-type network, or the like, and preferably can include the step of encrypting the data, such as private key to private key encryption.

In any such view of the invention, the method can further include the step of attaching data identifying the financial transaction to an electronic communication transmitted to enable carrying out the financial transaction.

In any such view of the invention, the method can further include the step of attaching data identifying a gift, such as flowers, as the financial transaction to an Internet greeting card transmitted to enable carrying out the financial transaction.

In any such view of the invention, the method can further include the step of providing a gift certificate, incentive (e.g., rebate, coupon, etc.), money, a cash surrogate (e.g., "Internet cash"), a stored value vehicle (e.g., a debit card), and the like as the financial transaction.

In any such view of the invention, the step of facilitating the financial transaction can be carried out with a computer communication from an intermediary from the group consisting of a broker, agent, and middleman.

In any such view of the invention, the method can further include the step of executing a card account to carry out the financial transaction.

In any such view of the invention, the method can further include the step of employing a wallet-enabled browser to communicate some of the data.

In any such view of the invention, the method can further include the step of accessing a bank account to make a payment for the financial transaction.

IV. BRIEF DESCRIPTION OF THE DRAWINGS

FIG. 13 is a table of data fields sent to Gift Merchant in connection with the code in the Appendix incorporated herein.

V. DETAILED DESCRIPTION OF A PREFERRED EMBODIMENT

As an overview of the system, the idea is to build an engine for carrying out a financial transaction, and representative applications, such as those involving the sending of flowers, gift certificates, contributions to charities, money, etc. can alternatively or even combinatively presented in a platform for other allied and similar activities. For the remainder of this discussion, such subsequent uses have little bearing except where constraints that might prove limiting in some regard.

Additionally, incorporated by reference herein is U.S. patent application Ser. No. 09/149,650 filed Sep. 8, 1998, in which I am also the inventor.

Figure 1:
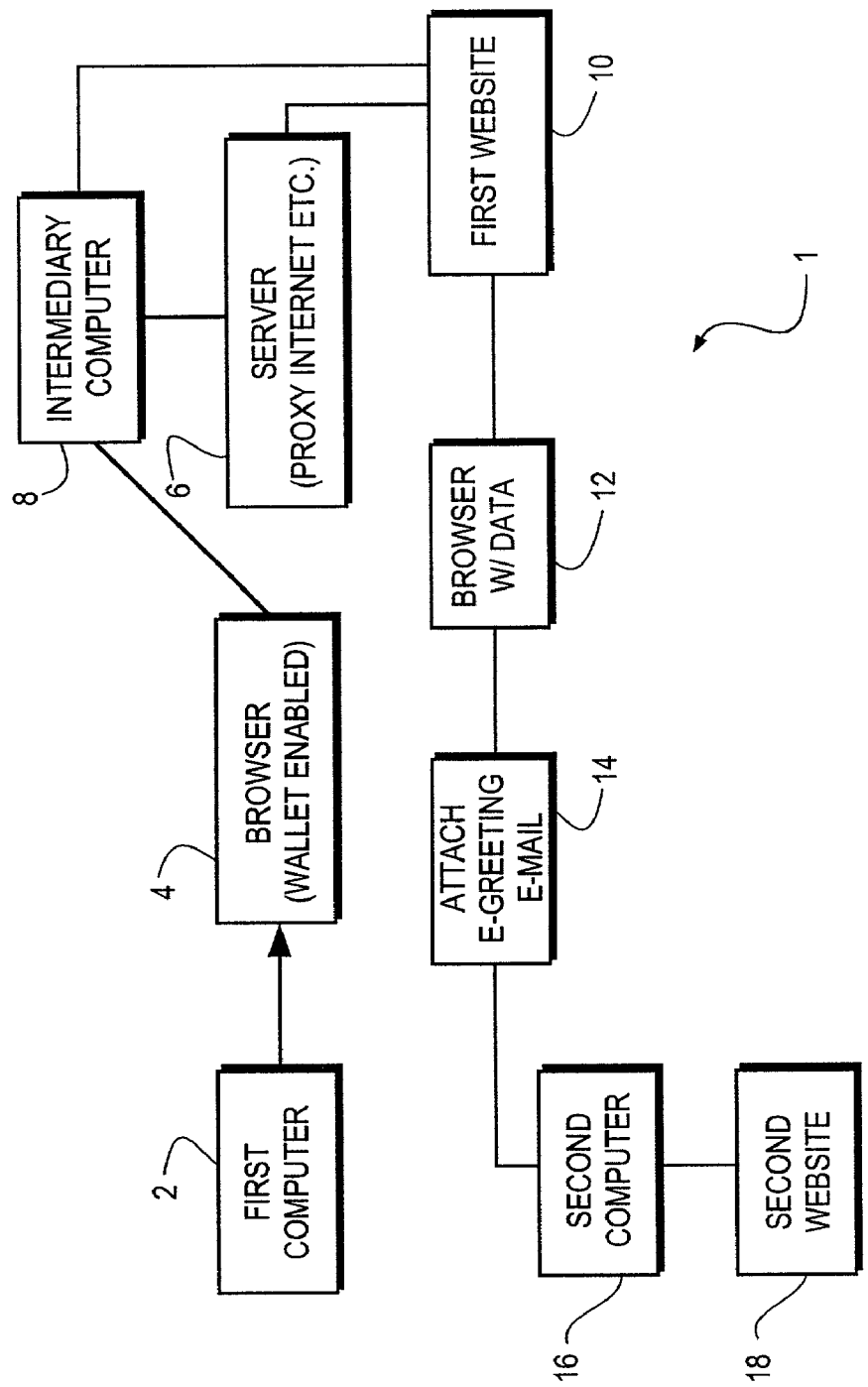
FIG. 1 is an illustration of an embodiment of the present invention focussing on hardware features.

Turning now to FIG. 1, there is shown an illustration of an embodiment of the present invention focussing on hardware features, in block diagram form, showing computer-based elements which can be utilized to implement the present invention. There is a computer system 1, which includes processor circuitry in a digital electrical first computer 2. For flexibility, it is preferable to have the processor circuitry formed by means of a computer program programming programmable circuitry, i.e., programming the computer (processor). The programming can be carried out with a computer program (or programs—e.g., see Appendix hereto incorporated by reference herein), which for flexibility should be in the form of software stored in an external memory, such as a diskette, hard disk, virtual disk, or the like. (The virtual disk is actually an extended internal memory which may assist in speeding up computing.) A diskette approach is optional, but it does provide a useful facility for inputting or storing data structures that are a product produced by the host software, as well as for inputting a software embodiment of the present invention. Of course storing the computer program in a software medium is optional because the same result can be obtained by replacing the computer program in a software medium with a hardware storage device, e.g., by burning the computer program into a ROM, using conventional techniques to convert software into an ASIC or FPGA, etc., as would be understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771-786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353-367, both of which are incorporated by reference.) In this regard, it should also be noted that "input" can include inputting data for processing by the computer program or inputting in the computer program code itself.

More particularly, first computer 2 can have a Pentium II processor running a Windows™ operating system, IBM™ compatible with monitor and keyboard and connected to the internet through tcp/ip protocol.

First computer 2 utilizes a browser 4, such as Netscape™ 4.0 or Internet Explorer™, potentially with Microsoft™ Wallet or other wallett installed browser.

Server 6 is a computer maintained by the user's internet service provider and can, for example, be a Pentium II internet server with a dial-up modem attached that the user dials into. This Pentium II computer is connected to the internet through a Cisco 5000 router with a T-1 internet connection from US Sprint.

In one embodiment, an intermediary computer 8 is another computer such as the first computer 2, e.g., with a Pentium II computer maintained by a broker or agent who has a business relationship with the company providing the invention so as to receive a share of transactions facilitated thereby. Computer 8 can be maintained by the provider of the invention is Sun internet server that is connected to the internet through a Cisco 5000 router with a T-1 internet connection from US Sprint and has database software installed as well as web hosting software.

Figure 2:
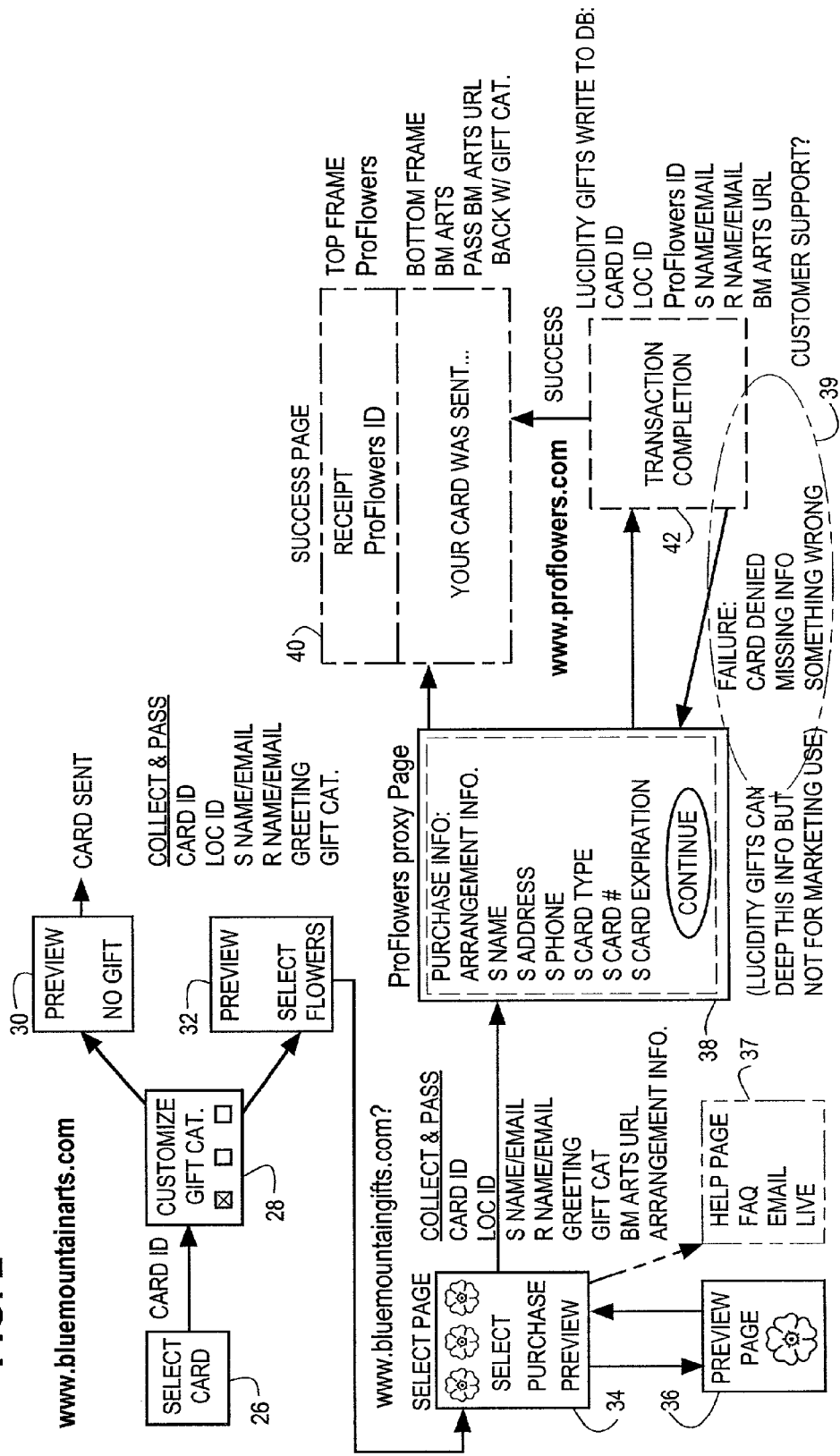
FIG. 2 is an illustration of a flow chart for an embodiment of the present invention.
Figure 9:
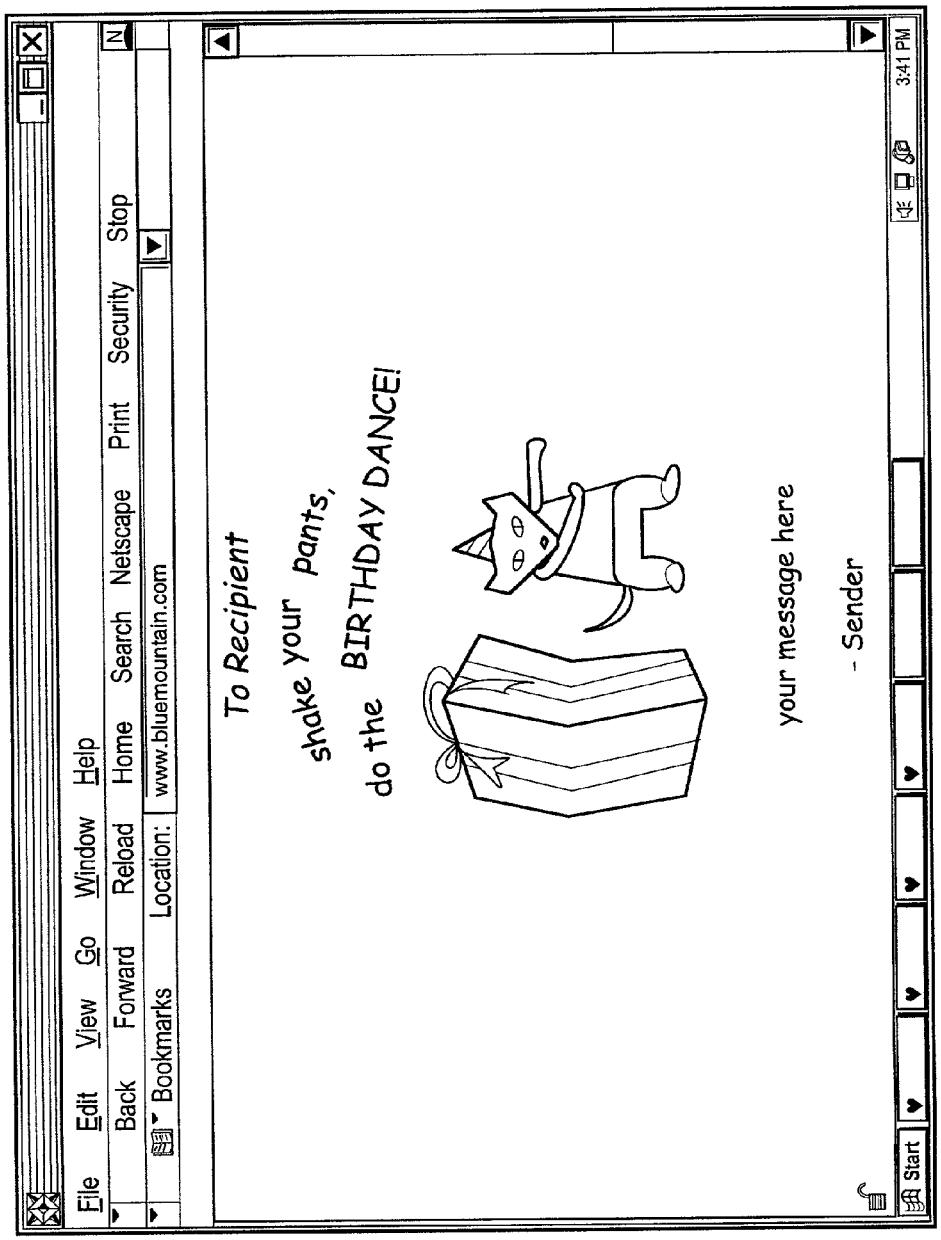
FIG. 9 is an illustration of a screen image for an embodiment of the present invention.
Figure 10:
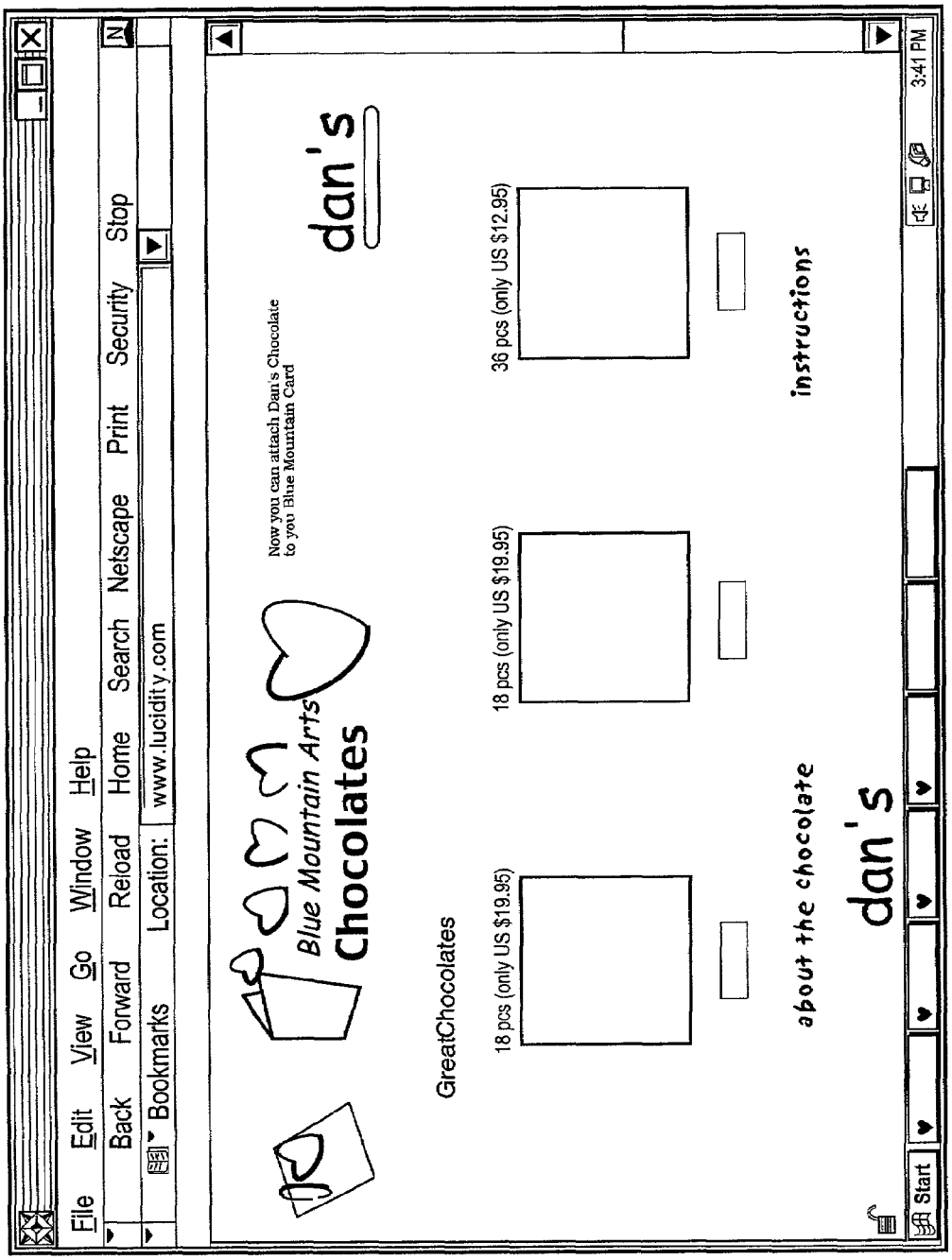
FIG. 10 is an illustration of a screen image for an embodiment of the present invention.
Figure 11:
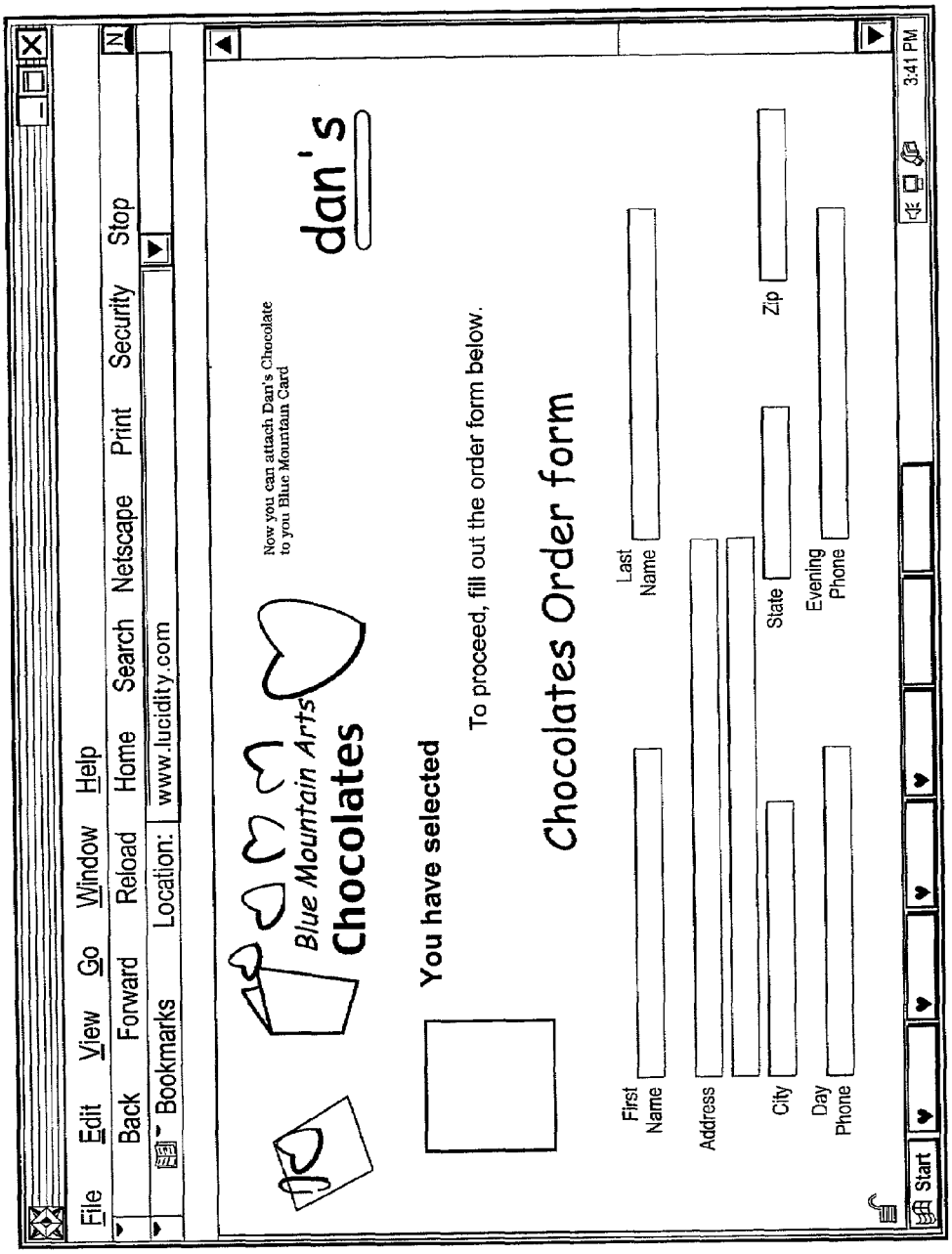
FIG. 11 is an illustration of a screen image for an embodiment of the present invention.
Figure 12:
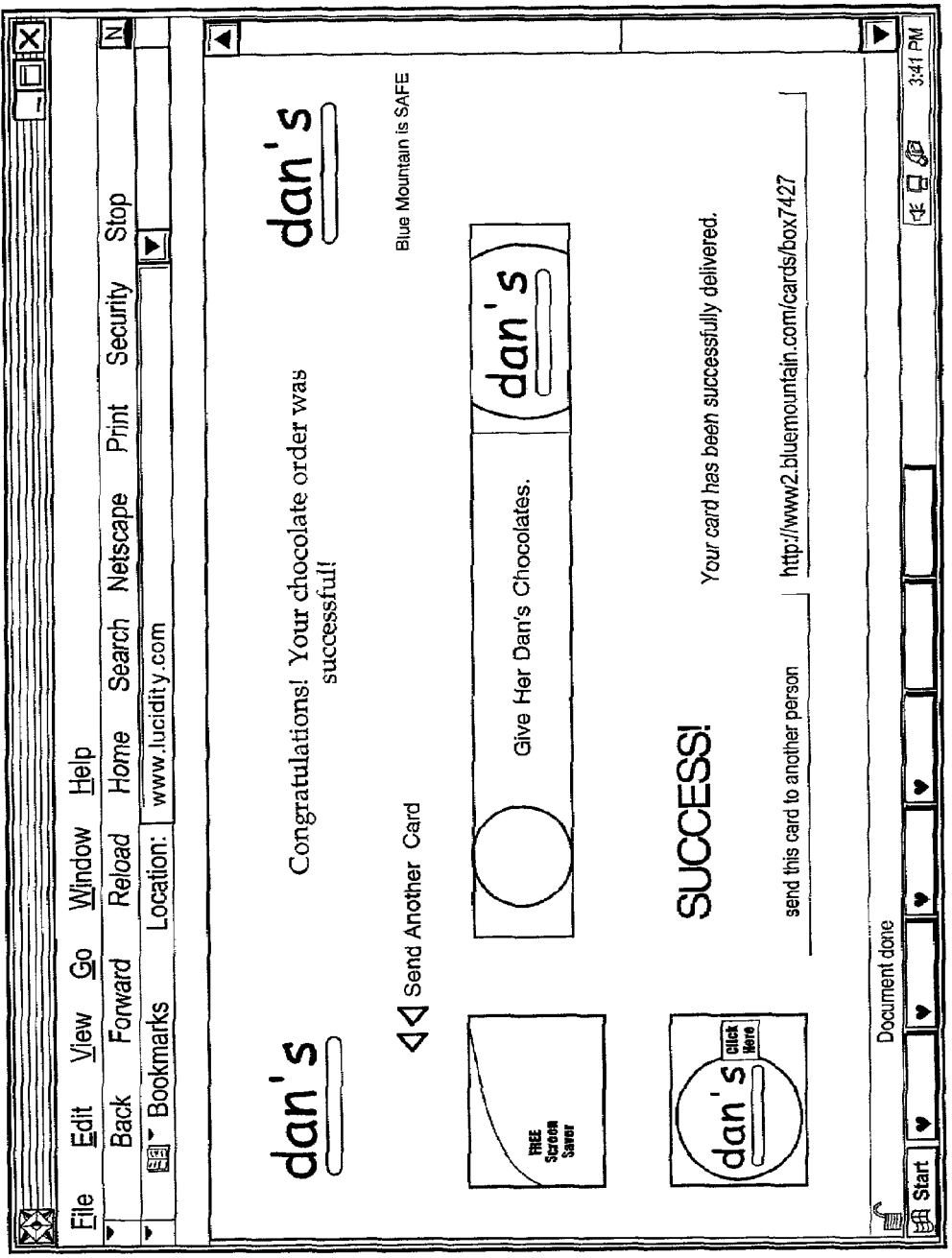
FIG. 12 is an illustration of a screen image for an embodiment of the present invention.

First web page 10, an example of which is depicted in FIG. 9, accessed as shown in FIG. 1, and elaborated in the more detailed descriptions of the other Figures herein. On this web page 10, stored on the hard drive of a computer 8 and viewed using the browser 4, html language or the like is used to place a graphical representation of the image (card) selected in subsequently discussed items 14, 26, 52, and 84 and to create blank fields labeled in 12 point font: "to" "from" and "You may also enter a personal message below". There are several check off boxes that say "Would you like to attach a ( ) charitable contribution ( ) flowers ( ) chocolates ( ) gift certificate to this card?" and the boxes are programmed (using html and java) such that the user can check one off by mousing over it and clicking. (Such selections are representative of the other applications of the present invention.) Finally there is a "click here to continue" bar at the bottom. If the "flowers" box is checked, then "click here to continue" is coded such that it links the user to a site that is described below in this section, if none of the gift attachment boxes are checked then "click here to continue" is coded such that it will link the user to a site such as page 30. Using html, the graphical representations of the product(s) for sale (flowers, gift certificates, and charitable contributions are described specifically below) or a textual description of the products for sale is created and stored on the hard drive of (8) an example of which is shown in FIG. 10. Prices are also entered for each product and are displayed under the graphical or textual representation of the product, if relevant. A graphical bar that says "order this assortment" (not shown in a Fig.) is linked to the appropriate application, here illustrated in FIG. 2 as preview page 36 which is the product that the user selects by clicking on the graphical bar beneath said product. Using html, text appearing at the bottom is created and stored on the hard drive of computer 8 that states "HELP PAGE FAQ EMAIL LIVE" and each one is linked to appropriate help areas 37. Using html, the graphical representation of all potential products that a user might select in select page 34 are created and stored on the hard drive of computer 8. The graphic conveyed by the link that was clicked on by the user in select page 34, which corresponds to the product chosen by the user, is the graphical representation that is displayed for the user on "preview page" 36. A graphical bar that says "confirm and send" is created and stored on the hard drive of computer 8 that links to proxy page 38. On proxy page 38, using html and frames, a series of blanks are created and incorporated into a visually appealing graphical layout and stored on the hard drive of computer 8 with text beneath them corresponding to what the user is supposed to enter into the blanks, an example of which is shown in FIG. 11. Empty blanks are created with the following text below them: 1. Name 2. Billing address 3. Phone number 4. (using html, a pulldown menu is created and stored on the hard drive of computer 8 featuring the names of popular credit cards) Credit card type 5. Credit Card Number 6. Credit Card expiration date. A graphical bar that says "continue" is created using html and stored on the hard drive of computer 8 and is coded to link to success page 40 and simultaneously send the information entered in this section to the flower company in a comma delineated ASCII text format through ftp (file transfer protocol). Using a proprietary system and Cybercash, the flower vendor attempts to authorize the credit card for the amount charged. The flower company then notifies via ftp or URL query or other standard form of query whether the information provided was valid or invalid. If the information was invalid, the code is created that sends the user back to proxy page 38 to attempt to re-enter the information. If the information was valid, code is created that sends users to success page 40 (shown in FIG. 12) and also sends a signal to attaching browser with data 12 (FIG. 1).

By using the URL as, or as part of, the data of the browser with data 12, identifier payment data is included that encapsulates the information entered in first web site 10 and/or site 38, some of which is encrypted, e.g., private-private key encrypted, for which keys are held by both the greeting card company and the provider of the information.

In attach E-greeting/E-mail 14, a greeting card company is notified via the URL or ftp so as to initiate the card-sending process via an email that is sent to the email address that was entered in the "to" blank in first web site 10.

Second computer 16, analogous to the first computer 2, can have a Pentium™ II processor running the Windows™ operating system, IBM™ compatible with monitor and keyboard and connected to the internet through tcp/ip protocol. Computer 16 accesses web page 18, which is created using html, frames, and java and is stored on the hard drive of computer 8, that is an electronic greeting card graphic featuring the information entered into the blanks in first web site 10 as well as the graphical element selected in select card 26. In addition, a graphical icon designated a gift icon examples of which are "flower icon" "gift certificate icon" and "charitable contribution icon" is created and stored on the hard drive of computer 8 and is placed on the page using html. For items requiring physical delivery, this gift icon is coded such that it links to a page html, frames, and java are used (and stored on the hard drive of a flower company web server) to create a web page with blank fields labeled in 12 point font: "name" "delivery address" "requested delivery date" (using html, a pulldown menu is created and stored on the hard drive of a flower company web server featuring the delivery dates allowed by the flower company). A graphical bar stating "Click to confirm" is created and placed using html and is coded such that it links to the following page describe immediately below in this section as well as sends the information entered into the blanks into the proprietary flower company shipment fulfillment system that will deliver the flowers to the person named above at the address named above on the date named above. In addition this notifies the proprietary system to charge the sender's credit card (entered and authorized in first web site 10) for the amount of the order. Using html and stored on the hard drive of computer 8, a textual message "Your gift has been claimed. Send thank you card? YES NO" and "yes" is linked to the thank you section of the greeting card side and "no" is linked to the main page of the greeting card company.

To illustrate the present invention in the example of a FLOWER SENDING PROCESS (illustrative of other applications), at select card 26, .jpg graphics (see example in Figs.) that are designed by artists are laid out on a web page using Hyper Text Markup Language (html) and frames. Several cards are presented and are clickable (e.g. linked to select card 28).

At the customize gift 28 web page, html language is used to place a graphical representation of the image (card) selected in select card 26 and to create blank fields labeled in 12 point font: "to" "from" and "You may also enter a personal message below". Finally there are several check off boxes that say "Would you like to attach a ( )charitable contribution ( )flowers ( )chocolates ( )gift certificate to this card?" and the boxes are programmed (using html and java) such that the user can check one off by mousing over it and clicking. Finally there is a "click here to continue" bar at the bottom. If the "flowers" box is checked, then "click here to continue" is coded such that it links the user to preview 32, if none of the gift attachment boxes are checked then "click here to continue" is coded such that it will link the user to preview 30 (as an example of first web site 10). Using html, the graphical representation of the electronic greeting card is created and stored on the hard drive of computer 8 with a "continue" bar that is coded so as to initiate the card-sending process via an email that is sent to the email address that was entered in the "to" blank in customize 28 and is coded such that it links and initiates a connection for the user to a page that confirms that the card was sent (without the gift attachment).

In preview 32, using html, the graphical representation of the electronic greeting card is created and stored on the hard drive of computer 8, along with a graphical representation that a gift is attached with a "continue" bar that is coded so as to link to web page 34. At web page 34, using html, the graphical representations of the product(s) for sale (in the case in which flowers or chocolates was checked off in customize 28) or a textual description of the products for sale (in the case in which gift certificates or charitable contributions was checked off in customize 28) is created and stored on the hard drive of computer 8. Prices are also entered for each product and are displayed under the graphical or textual representation of the product, if relevant. A graphical bar that says "order this assortment" is linked to the appropriate version of page 36 which is the product that the user selects by clicking on the graphical bar beneath said product. Using html, text appearing at the bottom is created and stored on the hard drive of computer 8 that states "HELP PAGE FAQ EMAIL LIVE" and each one is linked to appropriate help areas at help 37.

With regard to page 36, using html, the graphical representation of all potential products that a user might select in page 34 are created and stored on the hard drive of computer 8. The graphic conveyed by the link that was clicked on by the user in page 34 which is the product chosen by the user is the graphical representation that is displayed for the user on "preview page" 36. A graphical bar that says "confirm and send" is created and stored on the hard drive of computer 8 that links to page 38, e.g., a Proflowers proxy page. Using html and frames, a series of blanks are created and incorporated into a visually appealing graphical layout and stored on the hard drive of computer 8 with text beneath them corresponding to what the user is supposed to enter into the blanks. Empty blanks are created with the following text below them: 1. Name 2. Billing address 3. Phone number 4. (using html, a pulldown menu is created and stored on the hard drive of computer 8 featuring the names of popular credit cards) Credit card type 5. Credit Card Number 6. Credit Card expiration date. A graphical bar that says "continue" is created using html and stored on the hard drive of computer 8 and is coded to link to page 40 and simultaneously send the information entered in this section to the flower company in a comma delineated ASCII text format through ftp (file transfer protocol)

As to page 39, using a proprietary system and Cybercash, the flower vendor attempts to authorize the credit card for the amount charged. A variation of form of site 38 allows the user to enter a cash surrogate or direct debit their bank account as a form of payment, which is then respectively verified in page 39. The flower company then notifies us via ftp whether the information provided was valid or invalid. If the information was invalid, the code is created that sends the user back to page 38 to attempt to re-enter the information. If the information was valid, the code is created that sends users to page 40 and also sends a signal to the greeting card company via ftp or the URL or other standard query so as to initiate the card-sending process via an email that is sent to the email address that was entered in the "to" blank in customize 28.

Turning more particularly to success page 40, using html and frames, a web page is created and stored on the hard drive of computer 8 featuring the text "success" and "your card and gift have been sent".

Flower Receiving Process

Figure 3:
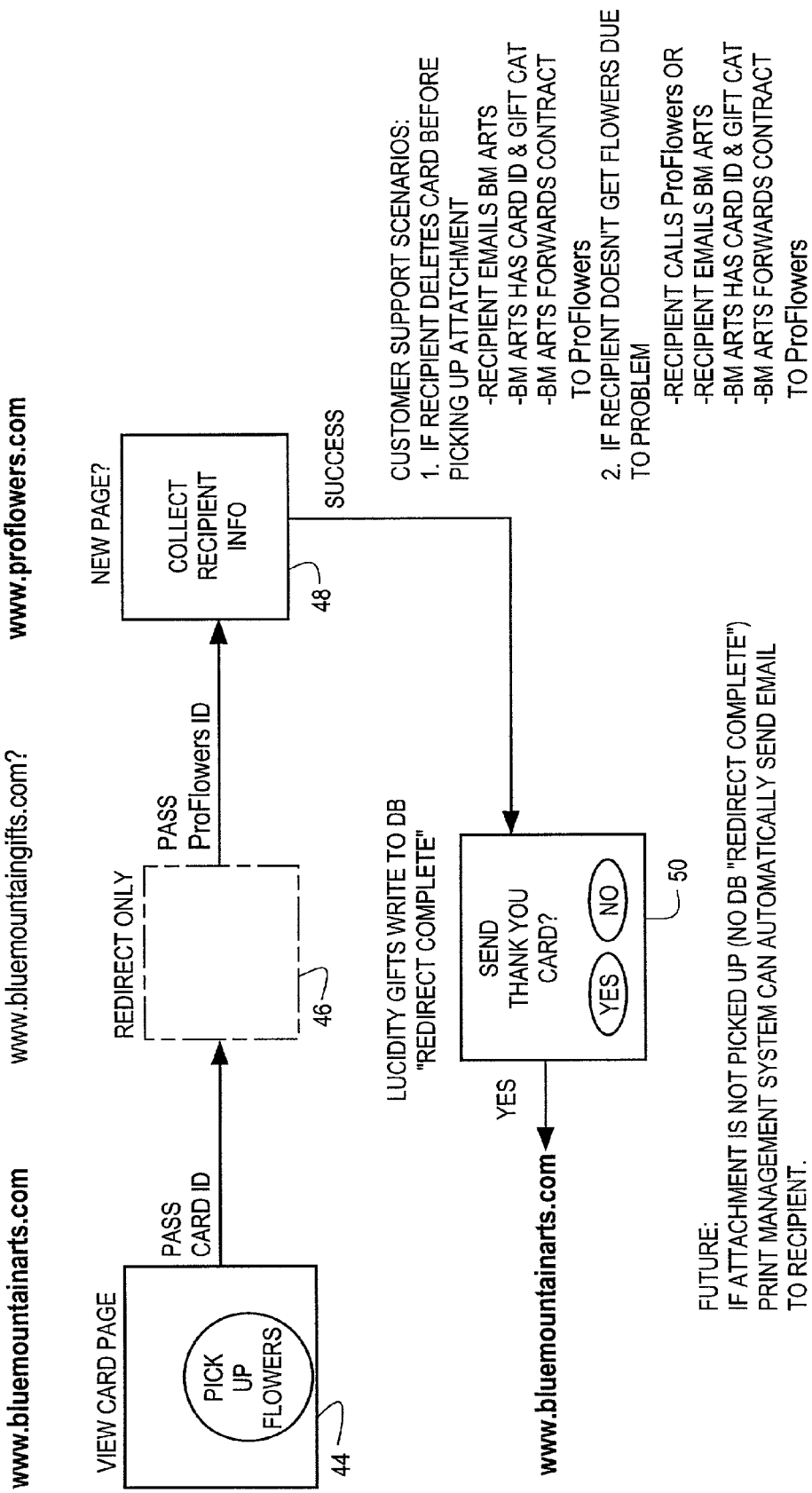
FIG. 3 is an illustration of a flow chart for an embodiment of the present invention.

Turn now to FIG. 3 wherein web page 44 is created using html, frames, and java and is stored on the hard drive of computer 8 that is an electronic greeting card graphic featuring the information entered into the blanks in customize 28, as well as the graphical element selected in select card 26. In addition, a graphical icon labeled "pick up flowers" is created and stored on the hard drive of computer 8 and is placed on the page using html. This "pick up flowers" icon is coded such that it links to redirect 46. Using an html redirect, redirect 46 creates a redirection that sends the user to new page? 48 which is a splash page hosted by the flower company.

At new page? 48, html, frames, and java are used (and stored on the hard drive of a flower company web server) to create a web page with blank fields labeled in 12 point font: "name" "delivery address" "requested delivery date" (using html, a pulldown menu is created and stored on the hard drive of a flower company web server featuring the delivery dates allowed by the flower company). A graphical bar stating "Click to confirm" is created and placed using html and is coded such that it links to block 50 as well as sends the information entered into the blanks into the proprietary flower company shipment fulfillment system that will deliver the flowers to the person named above at the address named above on the date named above. In addition this notifies the proprietary system to charge the sender's credit card (entered in page 38) and authorized in failure 39 for the amount of the order.

More particularly at block 50, using html and stored on the hard drive of computer 8, a textual message "Your gift has been claimed. Send thank you card? YES NO" and "yes" is linked to the thank you section of the greeting card side and "no" is linked to the main page of the greeting card company.

Gift Certificate Sender Process

Figure 4:
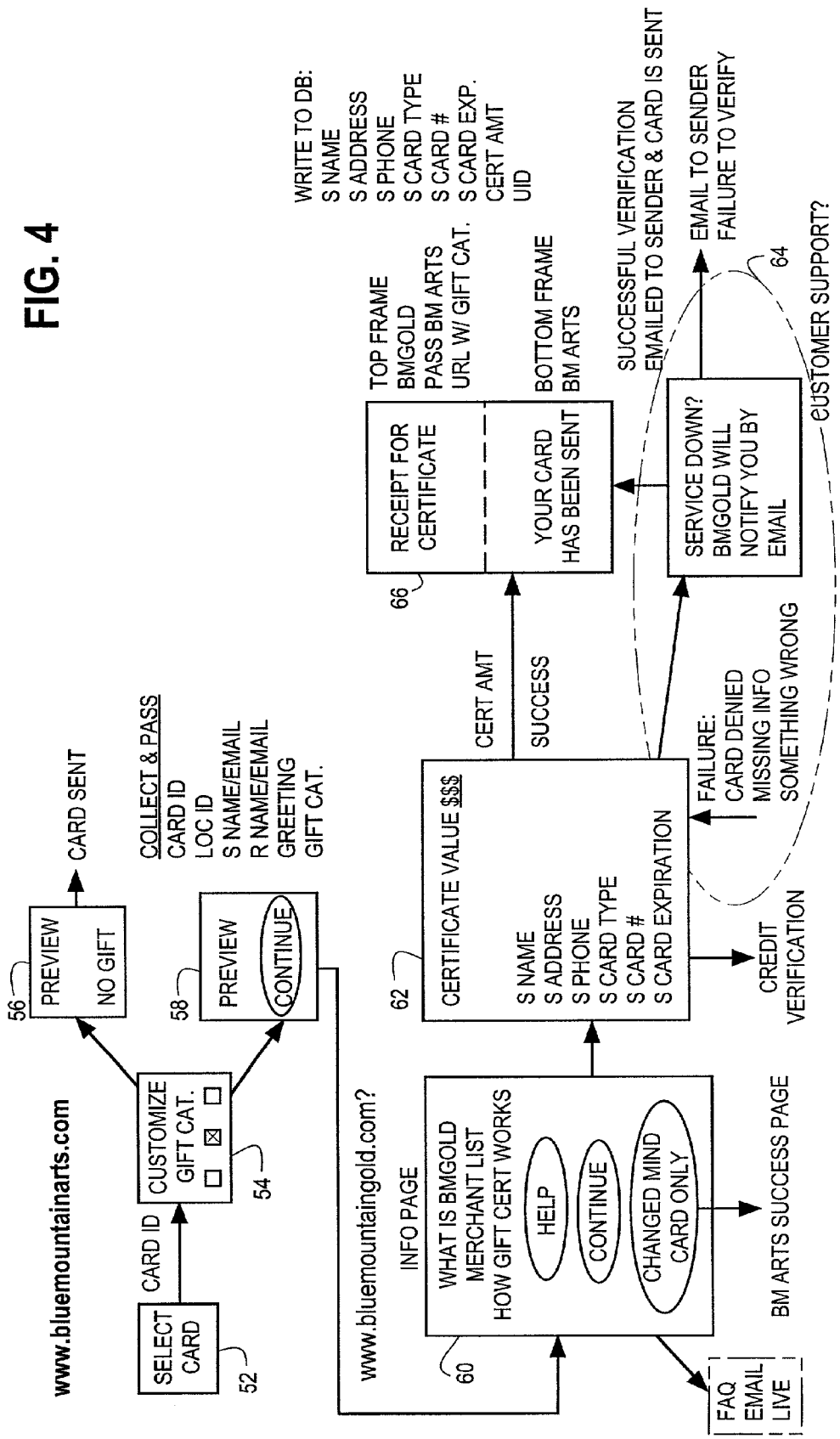
FIG. 4 is an illustration of a flow chart for an embodiment of the present invention.

FIG. 4 illustrates a variation on the theme, recycling previously discussed elements were appropriate to show modifications that may be desirable in one case or another. In FIG. 4, at select card 52, .jpg graphics (see subsequently discussed example) that are designed by artists are laid out on a web page using Hyper Text Markup Language (html) and frames. Several cards are presented and are clickable (e.g. linked to select card 52).

On this web page 54, html language is used to place a graphical representation of the image (card) selected in select card 52 and to create blank fields labeled in 12 point font: "to" "from" and "You may also enter a personal message below". Finally there are several check off boxes that say "Would you like to attach a ( )charitable contribution ( )flowers ( )chocolates ( )gift certificate to this card?" and the boxes are programmed (using html and java) such that the user can check one off by mousing over it and clicking. Finally there is a "click here to continue" bar at the bottom. If the "gift certificate" box is checked, then "click here to continue" is coded such that it links the user to preview 58, if none of the gift attachment boxes are checked then "click here to continue" is coded such that it will link the user to preview 56 (see analogous preview 30 in FIG. 2, etc.

At preview 58, using html, the graphical representation of the electronic greeting card is created and stored on the hard drive of computer 8 along with a graphical representation that a gift certificate is attached with a "continue" bar that is coded so as to link to web page 60.

At web page 60, using html, a textual description of the gift certificate and how it works is written and stored on the hard drive of computer 8, as well as logos of merchants who allow the gift certificate to be redeemed in their online stores. A graphical bar that says "continue" is linked to page 60. A graphical bar that says "changed my mind, send card without gift certificate" links to customize 54. Using html, text appearing at the bottom is created and stored on the hard drive of computer 8 that states "click here for help" and is linked to appropriate help areas.

At page 62, using html and frames, a series of blanks are created and incorporated into a visually appealing graphical layout and stored on the hard drive of computer 8 with text beneath them corresponding to what the user is supposed to enter into the blanks. Empty blanks are created with the following text below them: 1. Certificate Value 2. Name 3. Billing address 4. Phone number 5. (using html, a pulldown menu is created and stored on the hard drive of (8) featuring the names of popular credit cards) Credit card type 6. Credit Card Number 7. Credit Card expiration date. A graphical bar that says "continue" is created using html and stored on the hard drive of computer 8 and is coded to link to page 66 and simultaneously send the information entered in this section to a merchant bank using Cybercash and write to a database on the hard drive of computer 8. A variation of requesting "credit card type" and "credit card expiration date" allows the user to enter a cash surrogate or direct debit their bank account as a form of payment, which is then respectively verified in page 64.

At page 64, using merchant banking software and Cybercash, attempt is made to authorize the credit card for the amount entered into the "certificate value" blank in page 62. If the credit card company tells us that the information was invalid, the code is created that sends the user back to page 62 to attempt to re-enter the information. If the information was valid, the code is created that sends users to page 66 and also sends a signal to the greeting card company via ftp so as to initiate the card-sending process via an email that is sent to the email address that was entered in the "to" blank in page 62 and also initiates the charge for the amount specified in "certificate value" to the credit card specified in "credit card number" in page 62 using the proprietary system of a merchant bank. Compare the rest to analogous portions of FIG. 2. At this point the "gift certificate" itself may also be created, and the amount of money allocated to "certificate value" is the positive balance established for the gift certificate. From the Merchant Partners (sites that accept the "gift certificate," and in this case are shown on the "Gift Certificate Page" mentioned below) perspective, the payment is presented as a Visa or other stored value card. The present embodiment of the invention uses a "block" of potential debit card numbers provided by a merchant bank and through Wild Card Systems of Boca Raton. These debit card numbers can be "charged up" at will for any amount of money. Alternative ways to apply the invention include using this stored value card and the system 1 of passing along the encrypted payment information as an incentive, such as a coupon good for part of a purchase price or a rebate for purchasing specific products or services. Another way to employ this invention is for the recipient of the financial transfer to deposit the value conveyed through the stored value instrument in their own bank or other form of savings account or online financial management solution. In this way, one person can convey value in the form of a cash surrogate (a stored value Visa card) from one person to another person such that the value can be redeemed by the recipient without a merchant account or other form of recipient relationship with a financial institution.

Gift Certificate Redemption Process

Figure 5:
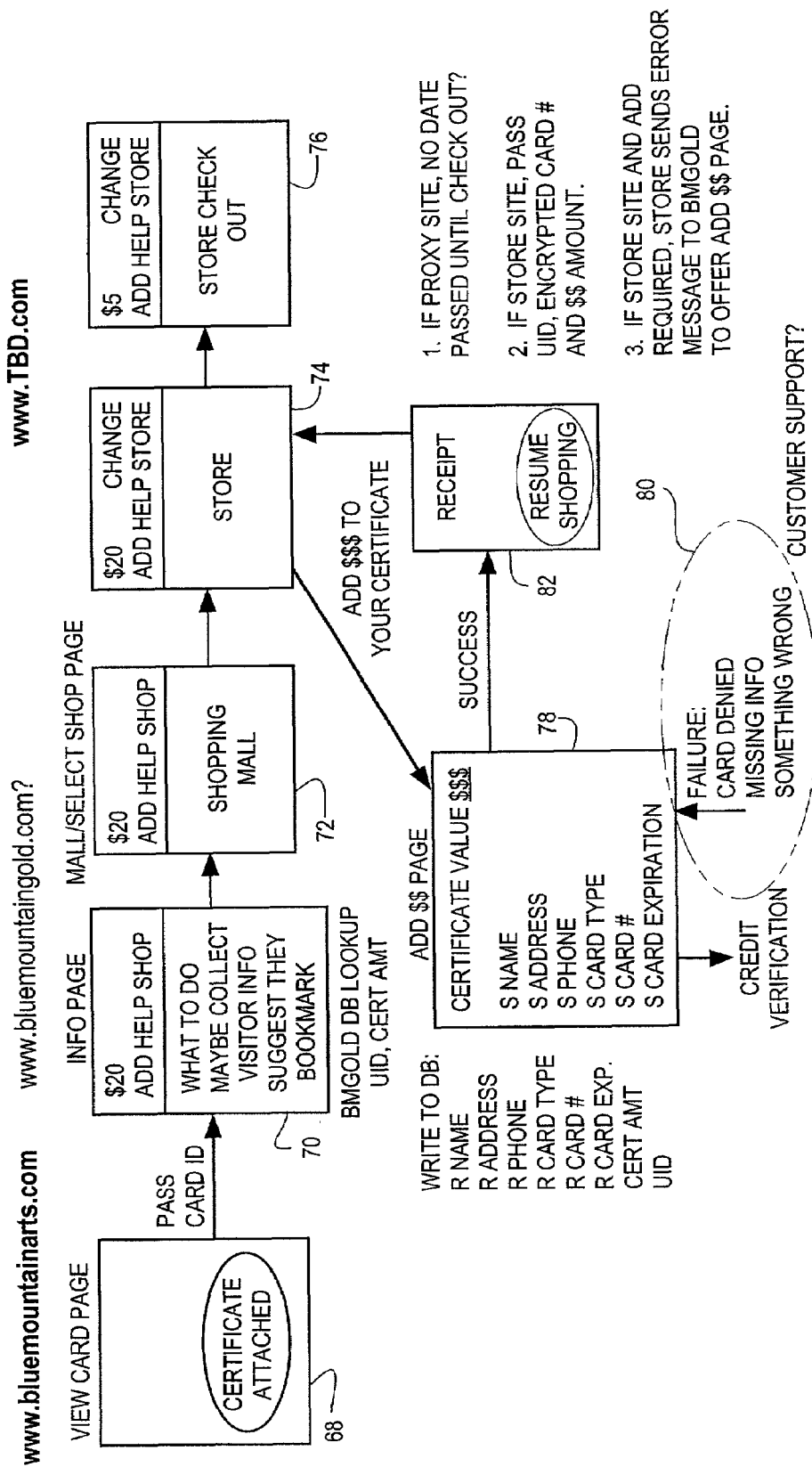
FIG. 5 is an illustration of a flow chart for an embodiment of the present invention.

Turning now to web page 68, in FIG. 5, a web page is created using html, frames, and java and is stored on the hard drive of computer 8 that is an electronic greeting card graphic featuring the information entered into the blanks in customize 28 as well as the graphical element selected in select card 26. In addition, a graphical icon labeled "pick up gift certificate" is created and stored on the hard drive of computer 8 and is placed on the page using html. This "pick up gift certificate" icon is coded such that it links to page 70.

At page 70, html and frames are used to create a webpage (stored on the hard drive of computer 8 that constitutes the electronic gift certificate "Blue Mountain Gold" which is a Visa stored value card that has been created by adding a dollar value to one in a series of "empty" VISA numbers assigned to us by our merchant bank and Wild Card Systems of Boca Raton, Fla. This Visa debit card number is encrypted using a proprietary private-private key encryption system. The amount of the gift certificate is displayed in the upper frame, and a textual request that the recipient bookmark this page (e.g. the Gift Certificate Page) lest he or she desire to return and spend any unused portion. A "continue shopping" icon is linked to page 72, wherein the upper frame from (70) is retained. Using html, the graphical logos of the stores that accept Blue Mountain Gold are displayed and each is linked using html to the appropriate store version of page 74, wherein the upper frame from page 70 is retained. Using html, the bottom frame is populated with the web site from the merchant chosen in page 72. Using a URL, encoded information is passed along to the merchant including: the visa debit card number (encoded in private-private key encryption) that can be used in their normal payment reconciliation system to pay for the order An example of this information is featured in FIG. 13. The information in FIG. 13 is hidden from the user and the user does not need to know what type of stored value card of other method involving a hidden cash surrogate is being used to convey payment information. Rather, the merchant accepts this cash surrogate as payment for the products ordered and confirms the order pursuant to their normal procedure.

At page 76, after the user has gone through the normal shopping experience of the selected merchant, he or she will ultimately arrive on a store check out page. Through a business arrangement with the merchant, they have created a variation of their normal check-out page for us that does not have a "payment information" area as that information is already known, having been passed along in page 74 through an encoded url that is translated using the private key and applied invisibly to the user.

At page 78, in the upper frame from pages 72, 74, and 76 there is crated using html a textual "add money to gift certificate" link that is linked to this web page, the "add money" page 78. The add money page allows the user (the recipient of the gift certificate in this case) to increase the value of the electronic gift certificate. Using html and frames, a series of blanks are created and incorporated into a visually appealing graphical layout and stored on the hard drive of (8) with text beneath them corresponding to what the user is supposed to enter into the blanks. Empty blanks are created with the following text below them: 1. Amount to add 2. Name 3. Billing address 4. Phone number 5. (using html, a pulldown menu is created and stored on the hard drive of computer 8, featuring the names of popular credit cards: Credit card type 6. Credit Card Number 7. Credit Card expiration date. A graphical bar that says "continue" is created using html and stored on the hard drive of computer 8 and is coded to link to page 82 and simultaneously send the information entered in this section to a merchant bank using Cybercash and write to a database on the hard drive of computer 8.

At page 80, using merchant banking software and Cybercash, attempt is made to authorize the credit card for the amount entered into the "Amount to add" blank in block 62. If the credit card company responds that the information was invalid, so the code is created that sends the user back to page 62 to attempt to re-enter the information. If the information was valid, the code is created that sends users to page 82 and initiates the charge for the amount specified in "amount to add" to the credit card specified in "credit card number" in page 78 using the proprietary system of a merchant bank. A variation of requesting "credit card type" and "credit card expiration date" allows the user to enter a cash surrogate or direct debit their bank account as a form of payment, which is then respectively verified. At page 82, using html and stored on the hard drive of computer 8, a textual message containing the receipt specifying the amount that has been added to the gift certificate and an graphical icon stating "resume shopping" is created that is coded such that it links back to pages 72, 74, or 76.

Charity Attachment

Figure 6:
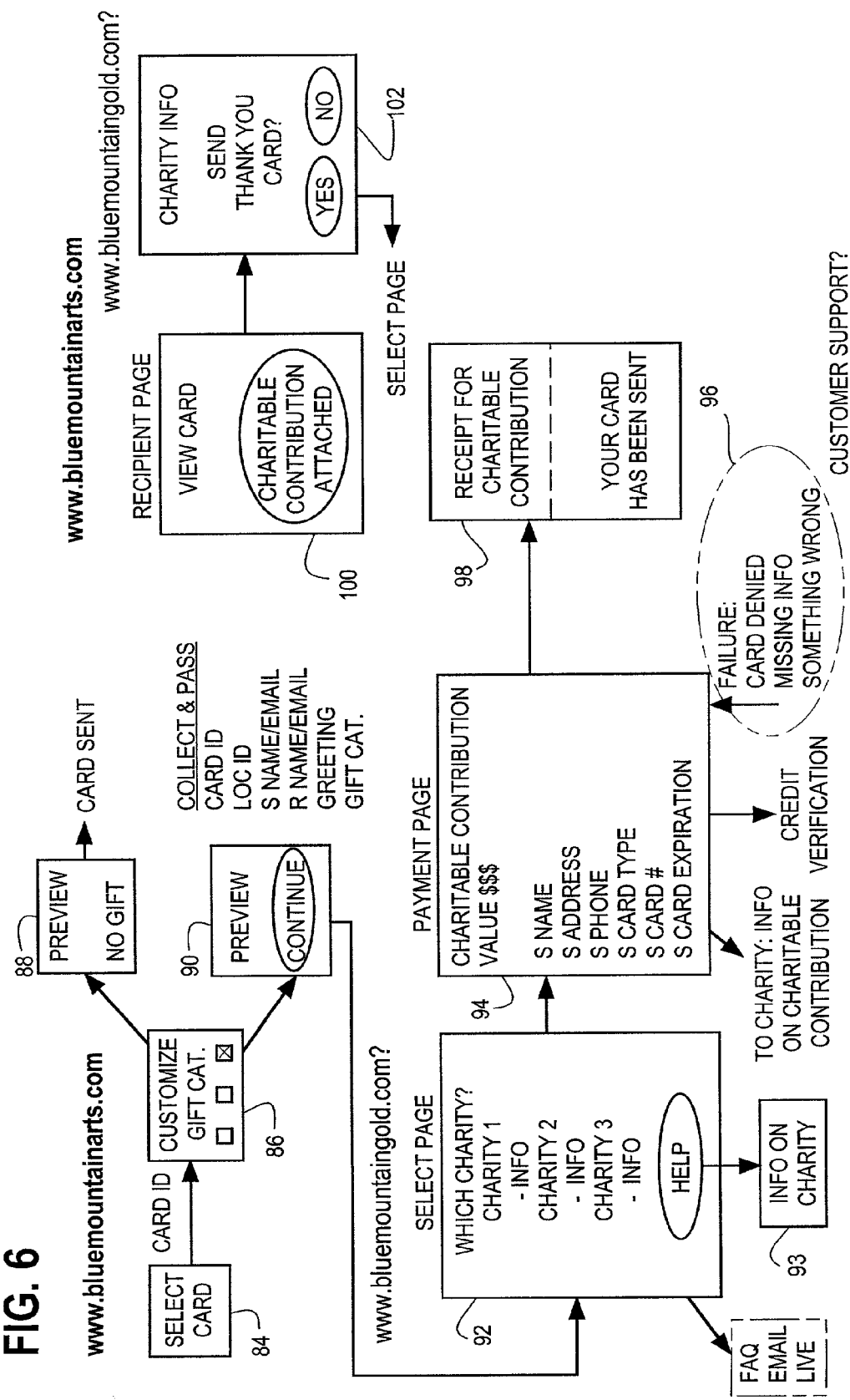
FIG. 6 is an illustration of a flow chart for an embodiment of the present invention.
Figure 7:
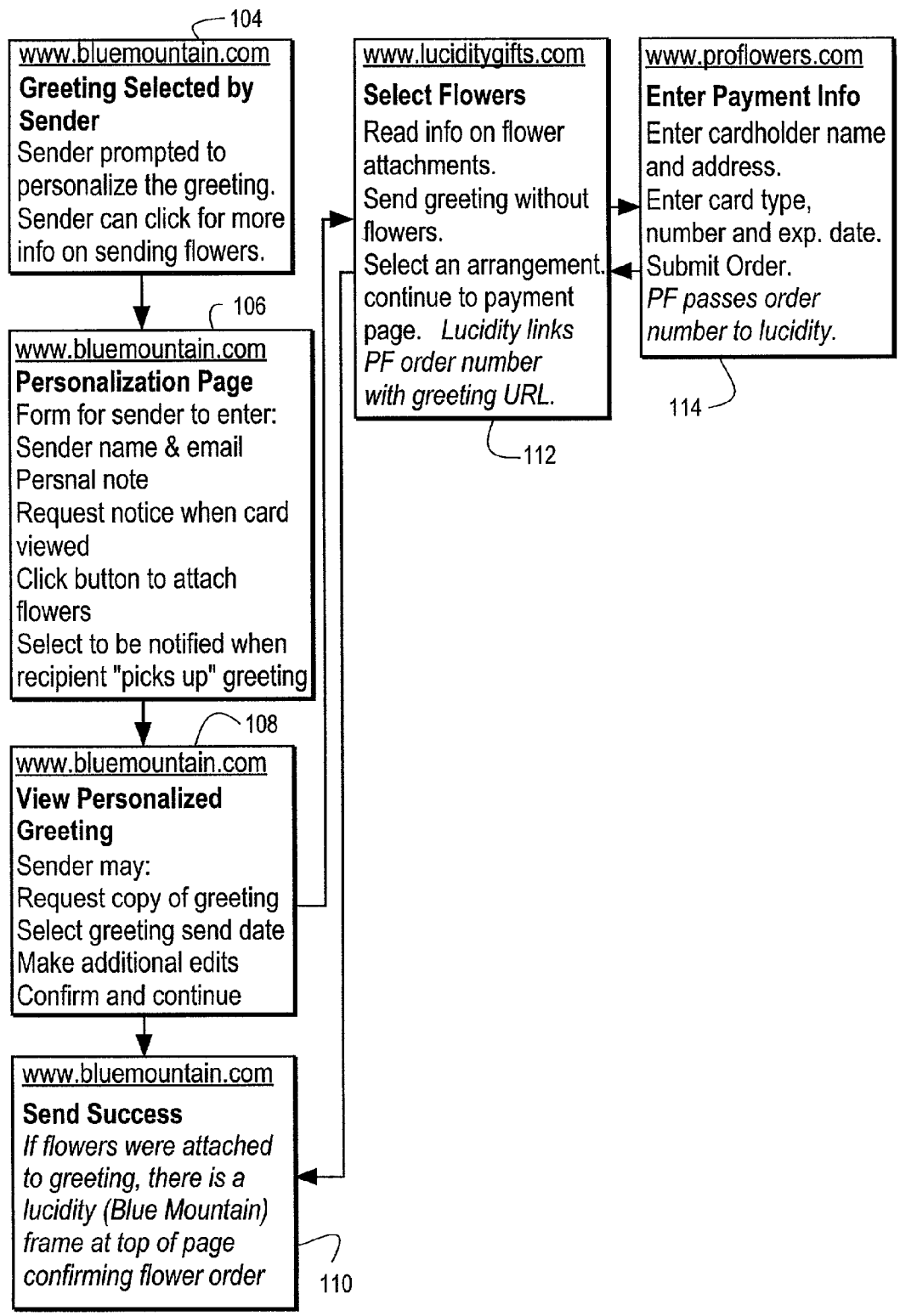
FIG. 7 is an illustration of a flow chart for an embodiment of the present invention.
Figure 8:
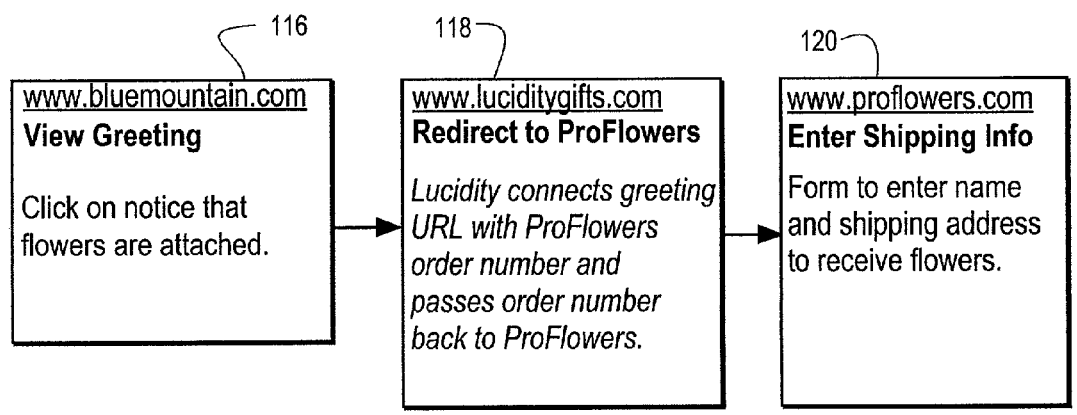
FIG. 8 is an illustration of a flow chart for an embodiment of the present invention.

Turning now to FIG. 6 for another variation on the theme, at select card 84, .jpg graphics (see example herein) that are designed by artists are laid out on a web page using Hyper Text Markup Language (html) and frames. Several cards are presented and are clickable (e.g. linked to customize 86.

On this web page 86, html language is used to place a graphical representation of the image (card) selected in select card 84 and to create blank fields labeled in 12 point font: "to" "from" and "You may also enter a personal message below". Finally there are several check off boxes that say "Would you like to attach a ( )charitable contribution ( )flowers ( )chocolates ( )gift certificate to this card?" and the boxes are programmed (using html and java) such that the user can check one off by mousing over it and clicking. Finally there is a "click here to continue" bar at the bottom. If the "charitable contribution" box is checked, then "click here to continue" is coded such that it links the user to page 90, if none of the gift attachment boxes are checked then "click here to continue" is coded such that it will link the user to page 88, which is analogous to page 30.

At page 90, using html, the graphical representation of the electronic greeting card is created and stored on the hard drive of computer 8, along with a graphical representation that a charitable contribution is attached with a "continue" bar that is coded so as to link to web page 92.

At web page 92, using html, a textual list of charities that with established relationships with and can convey payment to is written and stored on the hard drive of computer 8 as well as a textual link below each charity name offering additional information about said charity (linked to page 93). Each of the charity names are coded so as to be linked to pager 94 and convey with them the information regarding which charity has been selected via the url.

At page 93, information regarding the charity selected in page 92 is written and displayed using html and a link "return to select charity page" is featured that links back to page 92.

At page 94, using html and frames, a series of blanks are created and incorporated into a visually appealing graphical layout featuring the logo of the selected charity and stored on the hard drive of computer 8 with text beneath them corresponding to what the user is supposed to enter into the blanks. Empty blanks are created with the following text below them: 1. Amount to donate 2. Name 3. Billing address 4. Phone number 5. (using html, a pulldown menu is created and stored on the hard drive of computer 8 featuring the names of popular credit cards) Credit card type 6. Credit Card Number 7. Credit Card expiration date. A graphical bar that says "continue" is created using html and stored on the hard drive of computer 8 and is coded to link to pages 96 and 98 and simultaneously send the information entered in this section to a merchant bank using Cybercash and write to a database on hard drive of computer 8.

At page 96, using merchant banking software and Cybercash, attempt is made to authorize the credit card for the amount entered into the "amount to donate" blank in page 94. If the credit card company tells us that the information was invalid, the code is created that sends the user back to page 94 to attempt to re-enter the information. If the information was valid, the code is created that sends users to page 98 and also sends a signal to the greeting card company via ftp so as to initiate the card-sending process via an email that is sent to the email address that was entered in the "to" blank in page 28 and also initiates the charge for the amount specified in "amount to donate" to the credit card specified in "credit card number" in page 94 using the proprietary system of a merchant bank. A variation of requesting "credit card type" and "credit card expiration date" allows the user to enter a cash surrogate or direct debit their bank account as a form of payment in 94, which is then respectively verified in 96

At page 98, using html and frames, a web page is created and stored on the hard drive of computer 8 featuring the text "success" and "your card and donation to charity have been sent" on the lower frame and an upper frame is created that contains a receipt specifying the name of the charity and the amount that was donated in such a manner as the sender can print it for his or her tax records.

Charity Recipient

A web page 100 is created using html, frames, and java and is stored on the hard drive of computer 8 that is an electronic greeting card graphic featuring the information entered into the blanks in page 94 as well as the graphical element selected in select card 26. In addition, a graphical icon labeled "A donation of <insert value from page 94 'amount to donate'> has been made to <insert charity selection made in page 92>" is created and stored on the hard drive of computer 8 and is placed on the page using html. This graphical icon regarding the charity is created so as to be made clickable using html and links to page 102.

At page 102, using html and stored on the hard drive of computer 8, a textual message containing information about the charity similar to that which was written for page 93 below which is additional text stating "Send thank you card? YES NO" and "yes" is linked to the thank you section of the greeting card side and "no" is linked to the main page of the greeting card company.

Process for Sending Flowers with Blue Mountain Greetings

Continuing with the variations in the themes, page 104 is analogous to select card 26; 106 is analogous to customize 28; etc. Page 108 moves directly to page 110 (with no gift attachments chosen in page 106, which is otherwise analogous to preview 30. From page 108, the logic moves to page 112 (with a flower attachment) refers analogously to preview 32 and preview 36, etc., just as page 114 refers analogously to pages 38 and 39; page 110 refers analogously to page 40, and so forth.

Process for Receiving Flowers with Blue Mountain Greeting Cards

In carrying out theme of this variation, page 116 refers analogously to page 44, page 118 refers analogously to page 46, page 120 refers analogously to page 48, etc.

A representative FAQ can be as follows.

---

Blue Mountain Gifts

Frequently Asked Questions: Gift Certificates

1. Sending a Gift Certificate

Q: Describe what happens when I select a certificate to send with my greeting.

A: When you are customizing your greeting, you can choose to attach a gift certificate. After you have customized and previewed your greeting, you will be asked to select your gift certificate amount and enter a valid credit card to complete your gift certificate purchase. When the recipient receives the greeting, they will see a notice that a gift certificate is attached. When they click on that notice, they will be linked to a site where they can see the details of their certificate and how they can spend it.

Q: How does the recipient use the gift certificate?

A: The recipient can spend the gift certificate at any one of a number of shopping sites participating in the Blue Mountain gift program. After the recipient has viewed the greeting and gift certificate, the recipient can link to one of the shopping sites to shop. While the recipient is shopping, information about the certificate, including the balance on the certificate, remains on the top of the screen. When the recipient goes to checkout, the recipient is not prompted to enter a credit card. Instead, the recipient's certificate automatically is applied to the purchase. If there are insufficient funds in the certificate to complete the purchase, the recipient will be prompted to enter a credit card to add the amount of needed funds to the certificate, and complete the purchase.

Q: Can my certificate be any amount?

A: The gift certificate can be any amount within the minimum of $10 and a maximum of $200.

Q: Can I send a certificate outside the United States?

A: Yes, you can send a gift certificate to anyone in the world. The amount on the certificate, however, will always be in U.S. dollars.

Q: Is it safe to send my credit card and personal information over the Internet?

A: We use secure socket layer (SSL) technology to encrypt your personal information, including your credit card number, so that your private information cannot be read by anyone over the Internet.

Q: What if my credit card is denied or cannot be verified?

A: Retry your card in case there was a simple error such as transposing a number or not entering an expiration date. If your card still does not verify, please try another card.

Q: Can I change the certificate amount or delete it after it has been sent to the recipient?

A: After you have sent a gift certificate to someone your credit card already has been charged and we cannot change the transaction.

Q: What do I do if I enter the recipient's email address incorrectly?

A: If the address you entered was not a valid email address, it will not be delivered. We will notify you of that if it happens and you can resend your greeting with the correct address. If the address you entered was a valid address, however, your greeting and gift certificate will be delivered to that valid address. So please check the email address carefully when you enter it.

Q: What will the recipient need to do to use the gift certificate?

A: When the recipient receives their greeting, they see a notice that a gift certificate is attached. They simply click on the notice to view their certificate, learn about how and where to spend it, or go shopping immediately.

Q: Can I send the certificate for delivery in the future?

A: When you customize your greeting, you have the option of selecting a later date for delivery. Your certificate is delivered with the greeting, whenever that is.

Q: Can I change the date of delivery after it was sent?

A: After you have sent your greeting it is too late to change the delivery date.

Q: How do I cancel delivery of the certificate?

A: After you have sent the greeting and gift certificate, delivery cannot be cancelled.

Q: How can I confirm that the certificate was sent/received?

A: You can choose to be notified that the greeting was sent. You will not be notified, however, when the certificate is picked up. You will only be notified about the certificate if the recipient fails to pick it up within two weeks.

Q: Does the gift certificate have an expiration date?

A: Yes, the gift certificate will expire one year after the date it was created or the last date on which funds were added to it.

Receiving a Gift Certificate:

Q: What if I delete my greeting before I bookmark my gift certificate (add to favorites menu)?

A: Please contact our Customer Service Department at helpxxx@XXXXX.com (e.g., (e.g., bluemountain), and we'll resend your greeting and gift certificate.

Q: What do I need to do to use my gift certificate?

A: Simply click on the link to your certificate from the Blue Mountain greeting to which it was attached. Then you can shop at any one of a number of shopping sites participating in the Blue Mountain gift program. While you are shopping, information about your gift certificate, including the amount on the certificate, will remain at the top of the screen. When you go to checkout, you will not be prompted to enter any credit card information. Instead, your certificate will be redeemed automatically. If you have insufficient funds on the certificate to complete the purchase, you will be prompted to enter a credit card to add the difference to your certificate. Then, you can resume your checkout and complete the purchase.

Q: Where can I use the gift certificate?

A: At any one of a number of shopping sites participating in the Blue Mountain gift program.

Q: Can I spend my gift certificate in more than one place?

A: After you make a purchase with your gift certificate, if there is a balance remaining you can spend it at another shopping site if you wish.

Q: Can I increase the amount of my gift certificate by paying an additional fee?

A: You can add value to your certificate at any time by charging the additional sum to your credit card.

Q: How do I check the balance on my gift certificate?

A: The balance on your certificate is displayed when you click on the certificate from your greeting, and remains on the top of the screen the entire time you shop.

Q: Does the gift certificate have an expiration date?

A: Yes, the gift certificate will expire one year after it was last used. If it is never used, it will expire one year after it was created. You will receive a notice Q: Can I donate the balance on my gift certificate to charity?

A: Absolutely! One of the options you have at all times is to "spend" your gift certificate by donating the amount to a charity.

Q: What do I do to save my gift certificate so that I can use it at a later time?

A: Your gift certificate will automatically be available for you to spend any time until it expires. To "saved" the location of your gift certificate so that you can find it later, simply "bookmark" (add to your favorites menu in your browser) your greeting to which the gift certificate is attached. When you are ready to spend your certificate, simply click on the address for your greeting, then click on the gift certificate attachment notice again, and you will be linked to your certificate. Then you're ready to shop!

------------------------------------------------------------

Another representative FAQ can be as follows.

------------------------------------------------------------

Blue Mountain Gifts

Frequently Asked Questions: Charitable Donations

1. Sending

Q: Describe what happens when I send a charitable donation with my greeting.

A: While you are customizing your greeting, you have the option of attaching a charitable donation on behalf of the recipient. You simply select a charity and enter a valid credit card on the donation form. The recipient of your greeting will see a notice on the greeting that a donation was made on their behalf by you. They can click on the notice to see the specifics about your donation and the charity. You will receive an email receipt confirming your donation. This is NOT your tax receipt. You will receive your tax receipt directly from the charity at the end of the year.

Q: How does the recipient know that a charitable donation has been made in their name?

A: When the recipient receives your greeting, there is a notice attached to the greeting. They can click on the notice to find out the details of the donation and the charity.

Q: Can I change the charity or delete/change the donation after it has been sent?

A: Sorry, but once you have filled out the donation form and sent the greeting, your donation is immediately processed. It is not possible to change or delete your donation after that time.

Q: Can I contribute to more than one (1) charity?

A: Yes, you can contribute to more than one (1) charity. You can only attach one donation per greeting, however. But please feel free to send as many greetings and make as many donations as you wish!

Q: Am I limited to the listed charities?

A: Yes, currently the charities that we have listed are the only to which you can make donations. However, we will be adding new charities continuously and we welcome your suggestions. If there is a charity that you would like to see added to our gift program, please send your suggestion to: feedbackxxx@XXXXXX.com (e.g., (e.g., bluemountain).

Q: Is it safe to send my credit greeting and personal information over the Internet?

A: Absolutely. You will make your donation on a secure server using secure socket layer (SSL) technology. With this technology, your credit card information is encrypted from the time it leaves your computer until it reaches our server. And our server is protected with a firewall. Our state-of-the-art security measures assure you that your information will remain secure. In the unlikely event that your security is compromised, you are protected under law from fraudulent use of your credit card exceeding $50.

Q: What if my credit greeting is denied or cannot be verified?

A: You will have an opportunity to re-enter your credit card information because you may have made a simple error, such as transposing a number. If your card still does not clear, you may try another card.

Q: Is this a tax-deductible donation? If so, how do I get a tax receipt?

A: A donation to any of the charities in our gift program is tax deductible. The entire amount of your donation goes to the charity. Since you receive no tangible benefit in return, the entire amount is deductible by you. And, the credit card processing fee is covered by Blue Mountain Arts.

Q: How will the recipient know I made a charitable donation in their name?

A: When the recipient receives their greeting, they will see a note on the greeting telling them that a charitable donation was made in their behalf in connection with the greeting. The recipient is prompted to click on that note to find out the details of the donation and the charity.

Q: What do I do if I put in the wrong email address?

A: If you make a typo and enter a wrong email address the greeting card is not delivered and will be rejected and emailed back to Blue Mountain Arts. The donation that is attached to the greeting card does not go either. You will be notified via email that the card/donation could not be delivered. You can then re-enter the correct email address and retry. In the event that you have entered the wrong email address and it is a "valid" email address the card and gift will be delivered to the indicated recipient. Please be sure to enter the correct email address.

Q: What happens if the recipient does not receive the charitable donation information?

A: When your recipient receives the greeting card, the donation notice is received. However, if the recipient does not "pick up" their card or gift, reminders will be sent in email. Additionally, you will be notified if your gift has not been "picked up" in a timely manner. If the recipient inadvertently deletes the card with the gift attachment, they can contact our Customer Service Dept. at xxxx.com (e.g., BlueMountain) and have the card/donation resent.

Q: How can I confirm that the charitable donation was sent/received by the named charity?

A: You will receive an email receipt confirming the donation. This is NOT your tax receipt. You will receive a tax receipt from the charity at the end of the year.

Q: What if I delete the greeting before I view the charitable donation notification?

A: If you do not read the donation notice within xxxx days, your greeting will be resent to you as a reminder.

Q: What if I want to change the charity that receives the donation?

A: After the donation has been made, you cannot change the designated charity.

Q: Do I get a tax receipt for the charitable donation?

A: Yes. You receive your tax receipt directly from the charity at the end of the year.

Q: If the donation is made in my name, is it deductible by me?

A: Sorry, but the donation is deductible only by the person actually making the donation.

---

FIGS. 9-12 are illustrations a screen images in an example of an embodiment of the present invention. As previously mentioned, FIG. 13 is a table of data fields sent to Gift Merchant in connection with the code in the Appendix incorporated herein.

While a particular embodiment of the present invention has been disclosed, it is to be understood that various different modifications are possible and are within the true spirit of the invention, the scope of which is to be determined with reference to the claims set forth below. There is no intention to limit the invention to the exact disclosure presented herein as a teaching of one embodiment of the invention.

I claim:

1. A method of using an apparatus, the method including:
storing a value and credit card information in memory;
creating a value conveyance using the value and the credit card information by a computer associated with the memory;
associating the value conveyance and the value with a debit instrument number by the computer;
displaying the value conveyance and at least one link to a store on a first webpage of the computer;
receiving, over a network, a selection, from a browser displaying the first webpage, of at least one link to a store;
in response to the selection, encrypting the debit instrument number by the computer, redirecting the browser using the link to a second webpage, and transmitting to the second webpage a URL comprising the encrypted debit instrument number by the computer; and
receiving and storing, by the computer from the second webpage, an update to the value conveyance.

2. A method of using an apparatus, the method including:
storing a value and credit card information in memory;
creating a value conveyance using the value and the credit card information by a computer associated with the memory;
associating the value conveyance and the value with a debit instrument number by the computer;
displaying the value conveyance and at least one link to a product on a first webpage of the computer;
receiving, over a network, a selection, from a browser displaying the first webpage, of at least one link to a product;
in response to the selection, encrypting the debit instrument number by the computer, redirecting the browser using the link to a second webpage, and transmitting to the second webpage a URL comprising the encrypted debit instrument number by the computer; and
receiving and storing, by the computer from the second webpage, an update to the value conveyance.

3. A method of using an apparatus, the method including:
storing a value and credit card information in memory;
creating a value conveyance using the value and the credit card information by a computer associated with the memory;
associating the value conveyance and the value with a debit instrument number by the computer;
displaying the value conveyance and at least one link to a charitable contribution on a first webpage of the computer;
receiving, over a network, a selection, from a browser displaying the first webpage, of at least one link to a charitable contribution;
in response to the selection, encrypting the debit instrument number by the computer, redirecting the browser using the link to a second webpage, and transmitting to the second webpage a URL comprising the encrypted debit instrument number by the computer; and
receiving and storing, by the computer from the second webpage, an update to the value conveyance.

4. The method of any one of claims 1-3, wherein the encrypting comprises private key to private key encrypting.

5. The method of any one of claims 1-3, wherein the transmitting to the second webpage a URL comprising the encrypted debit instrument number by the computer is carried out invisibly to a computer associated with the browser.

6. Any one of claims 1-3, further including attaching data identifying the value conveyance to an Internet greeting card transmitted by the computer.

7. Any one of claims 1-3, further including attaching data identifying the value conveyance to an electronic communication transmitted by the computer.

8. Any one of claims 1-3, wherein the value conveyance comprises a gift to from one person to an other person, such the other person can redeem the value conveyance without the other person having a merchant account or a relationship with a financial institution, and further including attaching data identifying the gift to an Internet greeting card transmitted by the computer.

9. Any one of claims 1-3, wherein the value conveyance comprises a gift certificate.

10. Any one of claims 1-3, wherein the value conveyance comprises a coupon.

11. Any one of claims 1-3, wherein the value conveyance comprises a rebate.

12. Any one of claims 1-3, wherein the value conveyance comprises money.

13. Any one of claims 1-3, wherein the value conveyance comprises a cash surrogate.

14. Any one of claims 1-3, wherein the value conveyance comprises a stored value vehicle.

15. Any one of claims 1-3, wherein the value conveyance comprises a debt card instrument.

16. Any one of claims 1-3, further including providing a gift icon at the computer.

17. Any one of claims 1-3, further including, providing at the computer, an option to combine money with the value conveyance.

18. Apparatus including:
a digital electrical computer;
a memory storing executable instructions which when executed, causes the digital electrical computer to perform the operations of:
storing a value and credit card information in memory;
creating a value conveyance using the value and the credit card information by the computer associated with the memory;
associating the value conveyance and the value with a debit instrument number by the computer;
displaying the value conveyance and at least one link to a store on a first webpage of the computer;
receiving, over a network, a selection, from a browser displaying the first webpage, of at least one link to a store;
in response to the selection, encrypting the debit instrument number by the computer, redirecting the browser using the link to a second webpage, and transmitting to the second webpage a URL comprising the encrypted debit instrument number by the computer; and
receiving and storing, by the computer from the second webpage, an update to the value conveyance.

19. Apparatus including:
a digital electrical computer;
a memory storing executable instructions which when executed, causes the digital electrical computer to perform the operations of:
storing a value and credit card information in memory;
creating a value conveyance using the value and the credit card information by a computer associated with the memory;
associating the value conveyance and the value with a debit instrument number by the computer;
displaying the value conveyance and at least one link to a product on a first webpage of the computer;
receiving, over a network, a selection, from a browser displaying the first webpage, of at least one link to a product;
in response to the selection, encrypting the debit instrument number by the computer, redirecting the browser using the link to a second webpage, and transmitting to the second webpage a URL comprising the encrypted debit instrument number by the computer; and
receiving and storing, by the computer from the second webpage, an update to the value conveyance.

20. Apparatus including:
a digital electrical computer;
a memory storing executable instructions which when executed, causes the digital electrical computer to perform the operations of:
storing a value and credit card information in memory;
creating a value conveyance using the value and the credit card information by a computer associated with the memory;
associating the value conveyance and the value with a debit instrument number by the computer;
displaying the value conveyance and at least one link to a charitable contribution on a first webpage of the computer;
receiving, over a network, a selection, from a browser displaying the first webpage, of at least one link to a charitable contribution;
in response to the selection, encrypting the debit instrument number by the computer, redirecting the browser using the link to a second webpage, and transmitting to the second webpage a URL comprising the encrypted debit instrument number by the computer; and receiving and storing, by the computer from the second webpage, an update to the value conveyance.

21. The apparatus of any one of claims 18, 19, 20, further including a computer system associated with the browser.

22. The apparatus of any one of claims 18, 19, 20, further including a computer system communicating with the computer associated with the memory so as to create the value conveyance.

* * * * *